(12) United States Patent
Takagi

(10) Patent No.: US 6,757,145 B2
(45) Date of Patent: Jun. 29, 2004

(54) POWER SUPPLY SYSTEM BY USE OF VEHICLE

(75) Inventor: Kouichi Takagi, Nagoya (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 542 days.

(21) Appl. No.: 09/818,860

(22) Filed: Mar. 28, 2001

(65) Prior Publication Data

US 2001/0030843 A1 Oct. 18, 2001

(30) Foreign Application Priority Data

Mar. 29, 2000 (JP) ........................................ 2000-091149

(51) Int. Cl.[7] ................................................. H02H 3/00
(52) U.S. Cl. ........................ 361/93.1; 322/21; 307/9.1
(58) Field of Search ............................... 361/93.1, 93.2, 361/93.7, 93.9, 87; 307/9.1, 10.1, 10.7, 31, 24, 47, 48, 66; 322/7, 21, 27, 29, 37

(56) References Cited

U.S. PATENT DOCUMENTS

| | | | | |
|---|---|---|---|---|
| 4,323,837 A | * | 4/1982 | Nakamura et al. | 322/7 |
| 4,629,968 A | * | 12/1986 | Butts et al. | 322/29 |
| 5,111,788 A | * | 5/1992 | Washino | 123/339.11 |
| 5,355,273 A | | 10/1994 | Yoshizawa et al. | 361/93.1 |
| 5,614,768 A | * | 3/1997 | Tanaka | 290/40 C |
| 5,712,786 A | * | 1/1998 | Ueda | 701/110 |
| 6,440,037 B2 | * | 8/2002 | Takagi et al. | 477/37 |

FOREIGN PATENT DOCUMENTS

| | | | |
|---|---|---|---|
| JP | A 5-208645 | 8/1993 | B60R/16/02 |
| JP | U 5-74982 | 10/1993 | B60N/3/14 |
| JP | A 8-99577 | 4/1996 | B60N/3/14 |
| JP | A 9-23589 | 1/1997 | H02J/7/00 |
| JP | A 9-74666 | 3/1997 | H02H/7/18 |
| JP | Y2 2564199 | 11/1997 | B60N/3/14 |
| JP | A 10-68754 | 3/1998 | G01R/31/02 |

* cited by examiner

Primary Examiner—Ronald Leja
(74) Attorney, Agent, or Firm—Oliff & Berridge, PLC

(57) ABSTRACT

The power supply system includes an alternator that generates electric power according to the number of revolutions of an engine mounted in a vehicle and charges a predetermined battery; an output unit for outputting the electric power from the charged battery to the outside; a power generation control unit that detects the current amount of the electric power transmitted from the battery to the output unit and sets the number of engine revolutions according to the detected current amount; and an engine control unit that controls the number of revolutions of the engine in accordance with the number of engine revolutions set by the power generation control unit.

3 Claims, 2 Drawing Sheets

POWER SUPPLY SYSTEM BY USE OF VEHICLE

BACKGROUND OF THE INVENTION

1. Technical Field

The present invention relates to a power supply system that utilizes a vehicle as a power generator, and particularly to technology in which electric power according to the amount of use can be freely taken out in an idling state.

2. Related Art

Heretofore, as a supply source of power in the outdoors, there was generally only means that a user prepares a power generator by himself except for, for example, a case that plug sockets provided outdoors for use in a camp are used in a part of campgrounds as the supply source of power.

Problems to be Solved

However, even if he buys the power generator by himself, the chances for him to use it outdoors are very few, and it is unprofitably expensive. Further, the power generator requires a storage space, is inconvenient in portability, requires a set space when actually used outdoors and also requires regular maintenance. Therefore, it is very difficult to own the power generator individually.

In order to solve the above difficulty, it is thought that what is relatively high in spread rate and has capability of generating the electric power outdoors is used as a power generator, i.e., that a vehicle is utilized as a power generator.

In case that the vehicle is utilized as the power generator, the power is taken out from the vehicle in an idling state. However, since the power supply capability of the vehicle is determined by the number of engine revolutions, the least upper bound of the power amount capable of generating the power is low in the idling state where the number of engine revolutions is low, so that there is a defect that the power amount enough to be used cannot be supplied.

Therefore, an object of the invention is to provide a power supply system that can control the number of engine revolutions according to the amount of the used power in an idling state of a vehicle thereby to supply the power according to the amount of the used power.

Means for Solving the Problems

In order to solve the above problems, a power supply system according to the invention comprises an alternator that generates electric power according to the number of revolutions of an engine mounted in a vehicle and charges it in a predetermined battery; an output means for outputting the electric power charged in the battery to the outside; a power generation control means that detects the current amount of the electric power transmitted from the battery to the output means and sets the number of engine revolutions according to the detected current amount; and an engine control means that controls the number of revolutions of the engine in accordance with the number of engine revolutions set by the power generation control means.

In this case, the power generation control means, only during detecting the current amount exceeding the current immediately before exceeding the current amount of the electric power generated in the usual idling state, transmits the set number of engine revolutions to the engine control means. Further, the engine control means, only during receiving the number of revolutions of the engine from the power generation control means, controls the engine in accordance with the received number of engine revolutions, and when it does not receive the number of engine revolutions, it controls the engine in accordance with the number of engine revolutions in the usual idling state.

Otherwise, the power generation control means, in case that the detected current amount is a value exceeding the current amount immediately before exceeding the current amount of the electric power generated in the usual idling state, finds the difference between the set number of engine revolutions and the number of engine revolutions in the usual idling state and transmits its difference to the engine control means; and it, in case that the detected current amount is a value below the current amount immediately before exceeding the current amount of the electric power generated in the usual idling state, transmits the difference as zero to the engine control means. Further, the engine control means, upon reception of the difference from the power generation control means under the state where it controls the engine at the number of engine revolutions in the usual idling state, controls the engine in accordance with the number of engine revolutions obtained by adding the difference to the number of engine revolutions in the usual idling state.

Further, it is desirably that the output means are provided in a car room and outside the vehicle.

DETAILED DESCRIPTION OF THE PREFERRED EMBODIMENTS

Mode for Carrying Out the Invention

Figure 1:
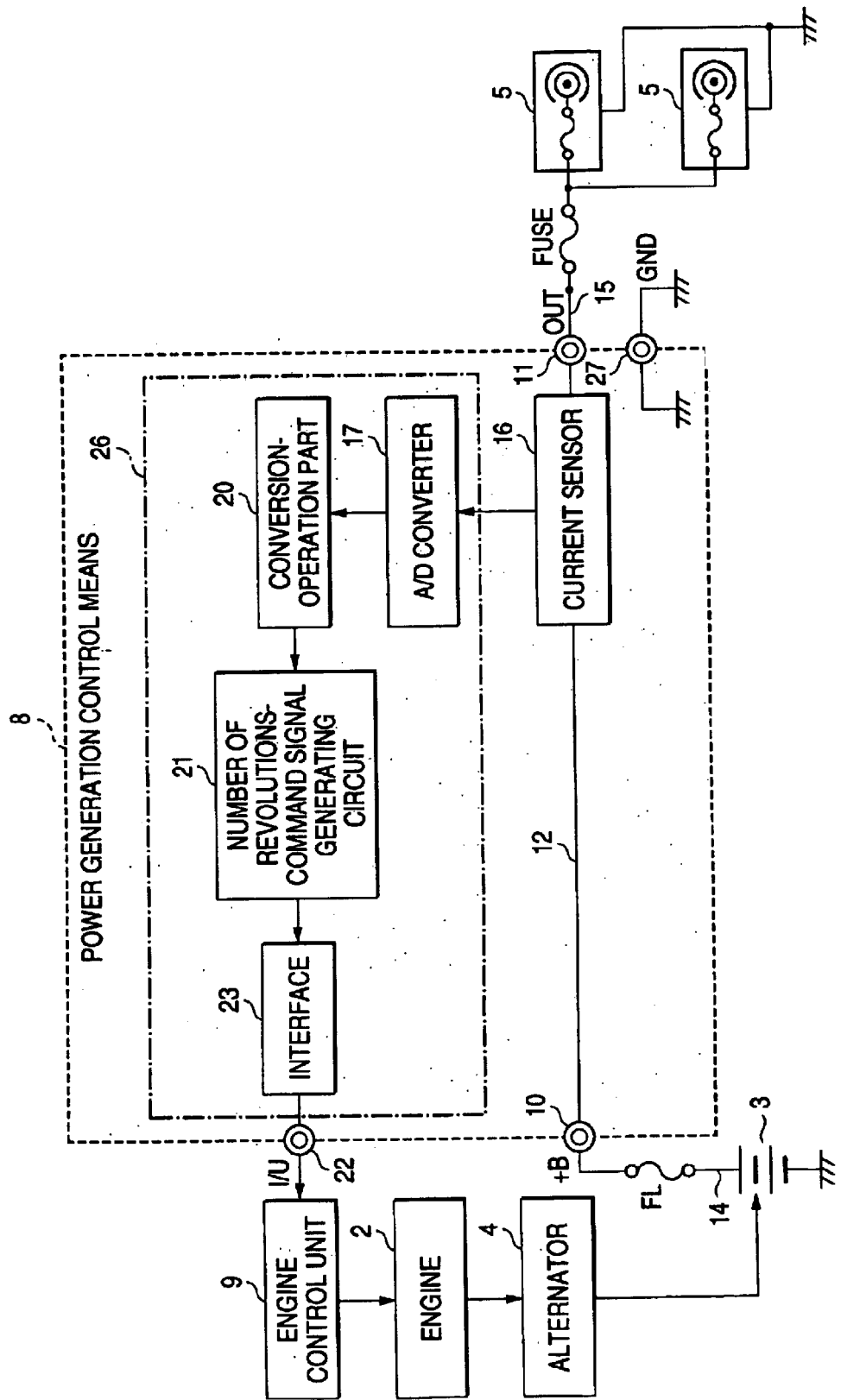
FIG. 1 is a constitutional diagram of a power supply system according to a first embodiment of the invention.
Figure 2:
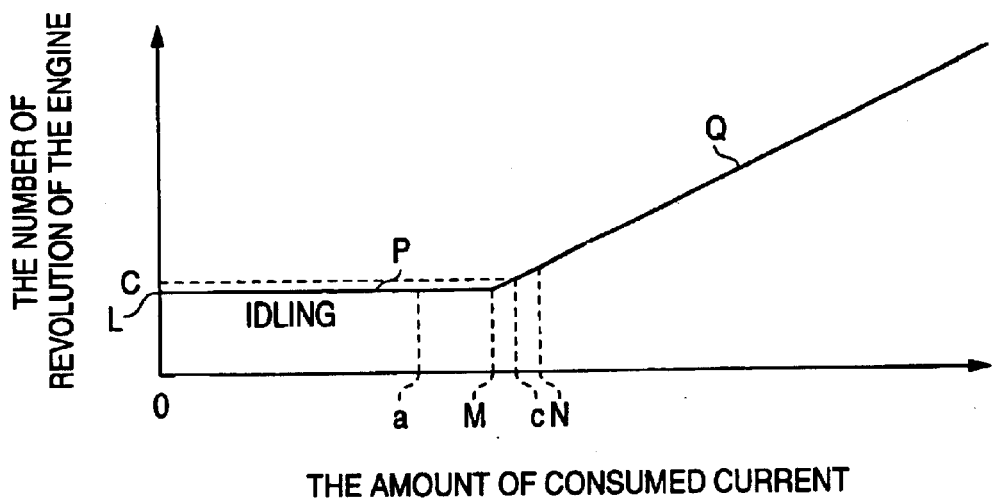
FIG. 2 is a diagram showing an example of the corresponding relation between the number of engine revolutions and the current amount, set in the power supply system according to the first embodiment of the invention.

A first embodiment of the invention will be described below with reference to FIGS. 1 and 2. FIG. 1 is a constitutional diagram of a power supply system according to the first embodiment of the invention, and FIG. 2 is a diagram showing an example of a corresponding relation between the number of engine revolutions set in the power supply system and the amount of consumed electric currents.

The power supply system in this embodiment is a system mounted in a vehicle such as an automobile for use. This system utilizes an alternator normally mounted in the vehicle as a power generating source, and particularly in an idling state of the vehicle, it controls automatically the power generating capability of the alternator according to the electric power supplied to the outside from a connection port such as a cigar lighter, an accessory socket, an inverter or the like from which the power can be output, whereby the electric power of the necessary amount can be freely taken out from the connection port.

Therefore, such the power supply system 1 is, as shown in FIG. 1, composed of an alternator that is driven by engine revolution energy supplied from an engine 2 of a vehicle, generates electric power according to the number of engine revolutions, and charges a predetermined battery 3; an output means for outputting the power from the charged battery 3 to the outside, such as an accessory socket 5; a power generation control device (power generation control means) 8 that checks the current amount of the electric power transmitted from the battery 3 to the accessory socket 5, that is, the current amount of consumed power, and sets the number of the engine revolutions which causes the alternator 9 to generate the power corresponding to the current amount of consumed power stably and efficiently; and an engine control unit (engine control means) 9 that controls the revolutions of the engine 2 in accordance with the number of engine revolutions obtained by the power generation control device 8.

The accessory sockets 5 are provided in a car room and outside the vehicle (for example, at a corner of a tail bumper or the like). Particularly, by providing the accessory socket also outside the vehicle, the power can be taken out from the outside of the vehicle.

The power generation control device 8 comprises an input terminal 10 to which the battery 3 is connected, an output terminal 11 to which the accessory socket 5 is connected, and a first power-transmission passage 12 leading from the input terminal 10 to the output terminal 11. To the input terminal 10, the battery 3 is connected through a second power-transmission passage 14, and to the output terminal 11, the accessory socket 5 is connected through a third power-transmission passage 15, whereby the power is transmitted from the battery 3 through the first, second and third power-transmission passages 12, 14 and 15 to the accessory socket 5.

Further, the power generation control device 8 comprises a current sensor 16 that is provided on the first power-transmission passage 12 and detects the current amount of the power transmitted from the battery 3 through the first, second and thirst power-transmission passages 12, 14 and 15 to the accessory socket 5 (that is, the current amount of consumed power); conversion-operation part 20 that sets, in accordance with the predetermined corresponding relation between the current amount of consumed power and the number of engine revolutions, the number of engine revolutions according to the current amount obtained through an A/D converter 17 by the current sensor 15; a number of revolutions-command signal-generating part 21 that converts the number of engine revolutions obtained by the conversion-operation part 20 into a signal and generates a number of revolutions-command signal; and a serial interface 23 that transmits the number of revolutions-command signal obtained by the number of revolutions-command signal-generating part 21 from the output terminal 22 to the engine control unit 9. The A/D converter 17, the conversion-operation part 20, the number of revolutions-command signal-generating part 21, and the serial interface 23 are respectively composed of a microcomputer 26. Further, the power generation control device 8 is grounded through a terminal 27.

In the conversion-operation part 20, the above-described corresponding relation between the amount of consumed current and the number of engine revolutions, for example the corresponding relation shown in FIG. 2 is stored in its predetermined memory as an operation expression or a data table. In this corresponding relation, to the amount of consumed current, the number of engine revolutions which causes the alternator 9 to generate the power corresponding to the amount of consumed current stably and efficiently corresponds. In FIG. 2, the amount of consumed current is plotted in a horizontal axis, and the number of engine revolutions is plotted in a vertical axis. A point N on the horizontal axis expresses the current amount of the power generated by the alternator 4 in the usual idling state.

Specifically, in this corresponding relation, to the amount of consumed current below a value M immediately before the current amount N, the number of engine revolutions L in the usual idling state corresponds by a function P parallel to the horizontal axis; and to the amount of consumed current over the value M, the number of engine revolutions that increases from the number of engine revolutions L corresponds by a linear increasing function Q.

The corresponding relation is set so that from the value M immediately before the current amount N of the power generated by the alternator 4 in the usual idling state, the number of engine revolutions increases from the value L in the usual idling state with the increases of the amount of consumed current, whereby before the consumed power reaches the power generating capability (N point) of the alternator 4 (at the M point), the power generating capability of the alternator 4 is heightened and the power supply is performed with the sufficient capability.

And, the conversion-operation part 20, upon reception of the current amount detected by the current sensor 16, compares the sizes of this detected current amount and the above current amount M. In case that the detected current amount is below the current amount M, the number of engine revolutions according to its current amount is found and set so that its notice is not given to the number of revolutions-command signal-generating part 21. Accordingly, in this case, the number of revolutions-command signal is not transmitted to the engine control unit 9 from the number of revolutions-command signal-generating part 21 through the serial interface 23 and the output terminal 22.

On the other hand, in case that the detected current amount is over the current amount M, in accordance with the above corresponding relation between the amount of consumed current and the number of engine revolutions, the number of engine revolutions according to its current amount (the amount of consumed current) is found and set as to be output to the number of revolutions-command signal-generating part 21. And, the output number of engine revolutions is converted into the number of revolutions-command signal by the number of revolutions-command signal-generating part 21, and transmitted to the engine control unit 9 through the serial interface 23 and the output terminal 22.

As described above, in the microcomputer 26, only while the current amount detected by the current sensor 16 (that is, the amount of consumed current) is exceeding the current amount M immediately before the current amount N of the power generated by the alternator 4 in the usual idling state, the number of engine revolutions is found (set) according to the detected current amount in accordance with the above corresponding relation and is being transmitted as the number of revolutions-command signal to the engine control unit 9.

The engine control unit 9, in case that it does not receive the number of revolutions-command signal from the microcomputer 26 in the idling state, causes the engine 2 to run idle at the usual idling, that is, at the number of engine revolutions L of a low speed. The engine control unit 9, during receiving the number of revolutions-command signal from the microcomputer 26, causes the engine 2 to run idle in accordance with the number of engine revolutions specified by this number of revolutions-command signal.

Next, the operation of the above power supply system 1 will be described with reference to FIGS. 1 and 2.

In the usual idling state, the engine control unit 9 controls the engine 2 so that the engine 2 runs idle at the number of engine revolutions L. And, the alternator 4 receives the revolution energy from the engine 2 to be driven, generates the electric power according to the number of the engine revolutions and charges the battery 3.

In this state, when the power is supplied from the accessory socket 5 to the outside, the current amount (the amount of consumed current) of the power transmitted from the battery through the first, second and third power-transmission passages 12, 14 and 15 to the accessory socket 5 is detected by the current sensor 16 and output through the A/D converter 17 to the conversion-operation part 20.

And, the conversion-operation part 20 compares the sizes of the current amount obtained by the current sensor 16 and the current amount M immediately before the current amount N of the power generated by the alternator 4 in the usual idling state. In case that the current amount obtained by the current sensor 16 is a value below the current amount M (for example, point a), the number of engine revolutions according to the current amount a is not found, so that notice of it is not given to the number of revolutions-command signal-generating part 21. Accordingly, in this case, since the number of revolutions-command signal is not transmitted from the number of revolutions-command signal-generating part 21 through the serial interface 23 and the output terminal 22 to the engine control unit 9, the engine control unit 9 keeps the engine 2 running idle at the usual idling, that is, at the number of engine revolutions L, so that the alternator 4 continues to generate the power according to the number of engine revolutions L and charge the battery 3.

When the power supplied from the accessory socket 5 to the outside increases from this state (point a) and the current amount (the amount of consumed current) detected by the current sensor 16 reaches a value over the current amount M, for example, a point c, the conversion-operation part 20 finds, in accordance with the corresponding relation in FIG. 2, the number of engine revolutions C corresponding to the current amount C and outputs it to the number of revolutions-command signal-generating part 21. And, the output number of engine revolutions C is converted into a number of revolutions-command signal by the number of revolutions-command signal-generating part 21, and then transmitted through the serial interface 23 and the output terminal 22 to the engine control unit 9.

And, the engine control unit 9, upon reception of the number of revolutions-command signal, increases the number of revolutions of the engine 2 is increased from the number of engine revolutions L in the usual idling state to the number of engine revolutions C specified by the number of revolutions-command signal. In result, with the increase of the number of revolutions of the engine 2, the power generating capability of the alternator 4 is heightened and the generated power increases, whereby the power supplied from the accessory socket 5 to the outside is generated with allowance and stored in the battery 3.

In case that the amount of consumed current increases or decreases in a range over the current amount M from this state (point c), the increased or decreased current amount is detected by the current sensor 16 and output to the conversion-operation part 20. The conversion-operation part 20, in accordance with the corresponding relation shown in FIG. 2, finds newly the number of engine revolutions according to the detected current amount, and keeps transmitting this new number of engine revolutions instead of the previously found number of engine revolutions to the number of revolutions-command signal-generating part 21. And, the new number of engine revolutions is received as the number of revolutions-command signal by the engine control unit 9 from the number of revolutions-command signal-generating part 21 through the serial interface 23 and the output terminal 22. The engine control unit 9 controls the idle running of the engine 2 in accordance with this new number of engine revolutions, and the alternator 4 generates the power according to this new number of engine revolutions and charges the battery 3.

On the other hand, in case that the amount of consumed current decreases below the current amount M from this state (point c), the conversion-operation part 20 finds the number of engine revolutions according to its current amount and does not give notice of the number of engine revolutions to the number of revolutions-command signal-generating part 21. Therefore, the number of revolutions-command signal is not received by the engine control unit 9 from the number of revolutions-command signal-generating part 21 through the serial interface 23 and the output terminal 22. Namely, since the engine control unit 9 does not receive the control from the microcomputer 26, it controls the idle running of the engine 2 at the usual idling. Accordingly, the alternator 4 generates the electric power with the power generating capability in the usual idling state and charges the battery 3.

According to the thus constructed power supply system 1, the current sensor 16 provided on the power-transmission passages 12, 14, 15 leading from the battery 3 to the accessory socket 5 detects the current amount (the amount of consumed current) of the power supplied from the accessory socket 5 to the outside; the conversion-operation part 20 finds the number of engine revolutions which causes the alternator 4 to generate the power corresponding to the detected amount of consumed current stably and efficiently; and the engine control unit 9 controls the idle running of the engine 2 at the found number of engine revolutions, whereby the power generated by the alternator 4 is automatically adjusted according to the power supplied from the accessory socket 5 to the outside. Therefore, the power necessary for the user can be used outdoors, reducing the restrictions of the power as much as possible and utilizing the automobile readily.

Further, not since the amount of consumed current reached the current amount N of the power generated by the alternator 4 in the idling state but since it reached the current amount M immediately before the current amount N, the number of engine revolutions is increased. Therefore, the power can be supplied with the sufficient capability, whereby the power can be stably supplied to the outside.

Further, only while the current amount over the current amount M immediately before exceeding the current amount N of the power generated in the usual idling state is being detected, the number of engine revolutions found according to the detected current amount is transmitted to the engine control unit 9 to control the number of revolutions of the engine. Therefore, while the number of engine revolutions in the usual idling state that is least necessary to drive stably the engine at the idling time is being kept, the power can best ably generated and supplied to the outside.

Further, since the accessory sockets 5 are provided in the car room and outside the vehicle, and particularly it is provided also outside the vehicle, the power can be taken out from the outside of the vehicle, so that easiness in use as a power supply source outdoors can be improved.

In this embodiment, the corresponding relation between the amount of consumed current and the number of engine revolutions as shown in FIG. 2 is used, in which in relation to the amount of consumed current over the current amount M immediately before the current amount N of the power generated by the alternator 4 in the usual idling state, the number of engine revolutions increases linearly with the increase of the current amount. However, the invention is not limited to it. For example, a corresponding relation as shown in FIG. 3 may be used, in which in relation to the current amount over the current amount M, the number of engine revolutions increases stepwise.

Further, in this embodiment, in order to increase and generate the power with the sufficient capability, the number of the engine revolutions is increased since the consumed power reached the value M immediately before the current amount N of the power generated by the alternator 4 in the usual idling state. However, the invention is not always limited to this. Though it is desirable to make the invention as described above, the number of the engine revolutions may be increased since the amount of consumed current reached the current value N.

Further, in this embodiment, the case where the set number of engine revolutions itself is converted into the number of revolution-command signal by the conversion-operation part 20 and then transmitted to the engine control unit 9 is described. However, the invention is not always limited to this. For example, by the conversion-operation part 20, the difference between the set number of engine revolutions and the number of engine revolutions L in the usual idling state may be obtained, and the obtained difference may be converted into the number of revolution-command signal and then may be transmitted to the engine control unit 9. Namely, in this modification, it is preferable to set the conversion-operation part 20 and the engine control unit 9 as described below.

Figure 3:
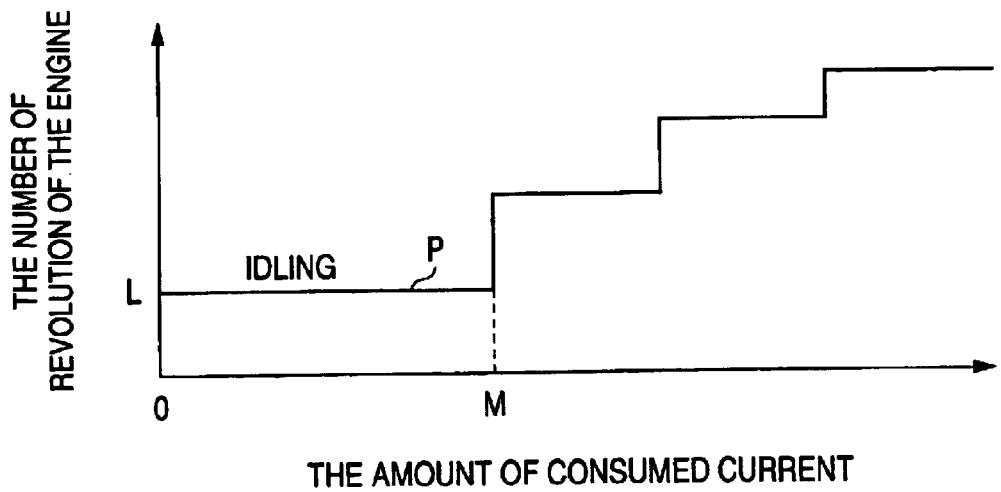
FIG. 3 is a diagram showing another example of the corresponding relation between the number of engine revolutions and the current amount, set in the power supply system according to the first embodiment of the invention.

Namely, the conversion-operation part 20, upon reception of the current amount from the current sensor 16, finds (sets), in accordance with the predetermined corresponding relation shown in FIG. 2 or 3, the number of engine revolutions according to the received current amount, finds the difference between the obtained number of engine revolutions and the number of engine revolutions L in the usual idling state, and transmits the obtained difference to the number of revolutions-command signal-generating part 21 thereby to convert the difference into the number of revolutions-command signal. In this case, when the current amount received from the current sensor 16, from the corresponding relation in FIG. 2 or 3, is the value below the current amount M immediately before exceeding the current amount N of the power generated in the usual idling state, the above difference obtained by the conversion-operation part 20 becomes zero, and this zero difference is converted into the number of revolutions-command signal by the number of revolutions-command signal-generating part 21 and then transmitted to the engine control unit 9. On the other hand, in case that the current amount received from the current sensor 16 is the value over the current amount M immediately before exceeding the current amount N of the power generated in the usual idling state, the above difference obtained by the conversion-operation part 20 becomes finite, and this difference is converted into the number of revolutions-command signal by the number of revolutions-command signal-generating part 21 and then transmitted to the engine control unit 9.

And, in the idling state, the engine control unit 9 is set to control the engine 2 at the number of engine revolutions L in the usual idling state. The unit 9, upon reception of the above number of revolutions-command signal from the microcomputer 26, is set to add the difference specified by its the number of revolutions-command signal to the number of the engine revolutions L and to cause the engine 2 to run idle in accordance with the added number of engine revolutions.

Hereby, in case that the current amount below the current amount M is detected by the current sensor 16, the zero difference is obtained by the conversion-operation part 20 and then transmitted to the engine control unit 9 as the number of revolutions-command signal. And, the engine control unit 9 adds the zero difference to the number of engine revolutions L in the usual idling state, and controls the idle running of the engine 2 virtually at the number of engine revolutions L in the usual idling state. On the other hand, in case that the current amount over the current amount M is detected by the current sensor 16, the difference (virtually finite difference) is obtained by the conversion-operation part 20 and then transmitted to the engine control unit 9 as the number of revolutions-command signal. And, the engine control unit 9 adds the difference to the number of engine revolutions L in the usual idling state, and controls the idle running of the engine 2 at the larger number of engine revolutions than the number of engine revolutions L in the usual idling state. In any cases, the power generating capability of the alternator 4 is adjusted as described in the first embodiment, and the alternator 4 generates the power according to the current amount detected by the current sensor 16.

In this modification, also, not since the amount of consumed current reached the current amount N of the power generated by the alternator 4 in the idling state but since the amount of consumed current reached the current amount M immediately before the current amount N, the number of the engine revolutions is increased. Namely, from the M point, the difference (the virtually finite difference) between the set number of engine revolutions and the number of engine revolutions in the usual idling state is transmitted to the engine control unit 9, and the engine control unit 9 controls the number of revolutions of the engine 2 at the larger number of engine revolutions than the number of engine revolutions L in the usual idling state. Therefore, the power can be supplied with the sufficient capacity, whereby the power can be stably supplied to the outside.

Further, in case that the amount of consumed current is the value below the current amount $\underline{M}$ immediately before exceeding the current amount $\underline{N}$ of the power generated in the usual idling state, the zero difference is transmitted to the engine control unit 9 to cause the engine control means to control the number of revolution of the engine 2 at the number of engine revolutions L in the usual idling state. Therefore, while the number of engine revolutions in the usual idling state that is least necessary to drive stably the engine 2 at the idling time at the minimum is being kept, the power can be stably generated and supplied to the outside.

Effect of the Invention

According to the first aspect of the invention, the power generation control means detects the current amount of the power transmitted from the battery to the output means and sets the number of engine revolutions according to the detected current amount, and the engine control means controls the number of engine revolutions in accordance with the set number of engine revolutions to adjust the power generating capability of the alternator. Therefore, the power generated by the alternator can be automatically adjusted according to the power taken out to the outside by the output means, whereby the power necessary for the user can be used outdoors, reducing the restrictions of the power as much as possible and utilizing the automobile readily.

According to the second aspect of the invention, the power generation control means, since it detected the current amount immediately before exceeding the current amount of the power generated in the usual idling state, transmits the number of engine revolutions set according to the detected current amount to the engine control means to control the number of revolutions of the engine. Therefore, before the power taken out from the output means exceeds the power generating capability of the alternator, the power generating capability of the alternator can be heightened, whereby the power can be generated with the sufficient capability and supplied to the outside.

Further, only while the power generating control means is detecting the current amount over the current amount immediately before exceeding the current amount of the power generated in the usual idling state, it transmits the number of engine revolutions set according to the detected current amount to the engine control means to control the number of revolutions of the engine. Therefore, while the number of engine revolutions in the usual idling state that is least necessary to drive stably the engine at the idling time is being kept, the power can be stably generated and supplied to the outside.

According to the third aspect of the invention, the power generation control means, since the detected current amount was over the current amount immediately before exceeding the current amount of the power generated in the usual idling state, transmits the difference between the set number of engine revolutions and the number of engine revolutions in the usual idling state to the engine control means thereby to control the number of revolutions of the engine. Therefore, before the power taken out from the output means exceeds the power generating capability of the alternator, the power generating capability of the alternator can be heightened, whereby the power can be generated with the sufficient capability and supplied to the outside.

Further, the power generation control means, in case that the detected current amount is below the current amount immediately before exceeding the current amount of the power generated in the usual idling state, transmits the difference as zero to the engine control means, and causes the engine control means to control the revolutions of the engine at the number of engine revolutions in the usual idling state. Therefore, while the number of engine revolutions in the usual idling state that is least necessary to drive stably the engine at the idling time is being kept, the power can be stably generated and supplied to the outside.

According to the fourth aspect of the invention, since the output means are provided in the car room and outside the vehicle, and particularly since the output means is provided also outside the vehicle, the power can be taken out from the outside of the vehicle, so that easiness in use as a power supply source outdoors can be improved.

What is claimed is:

1. A power supply system by use of a vehicle, comprising:

an alternator that generates electric power according to the number of revolutions of an engine mounted in a vehicle and charges a predetermined battery;

output means for outputting the electric power from said charged battery to the outside;

power generation control means that detects the current amount of the electric power transmitted from said battery to said output means and sets the number of engine revolutions according to the detected current amount; and engine control means that controls the number of revolutions of said engine in accordance with the number of engine revolutions set by said power generation control means, wherein said power generation control means, in case that the detected current amount is a value over the current amount immediately before exceeding the current amount of the electric power generated in the usual idling state, finds the difference between the set number of engine revolutions and the number of engine revolutions in the usual idling state and transmits the difference to said engine control means; and said power generation control means, in case that the detected current amount is a value below the current amount immediately before exceeding the current amount of the electric power generated in the usual idling state, transmits the difference as zero to said engine control means, and said engine control means, upon reception of the difference from said power generation control means under the state where said engine control means controls said engine at the number of engine revolutions in the usual idling state, controls said engine in accordance with the number of engine revolutions obtained by adding the difference to the number of engine revolutions in the usual idling state.

2. The power supply system by use of a vehicle according to claim 1, wherein said power generation control means transmits, during detecting the current amount over the current immediately before exceeding the current amount of the electric power generating in the usual idling state, the difference in number of engine revolutions to said engine control means, and said engine control means, only during receiving the difference in number of engine revolutions from said power generation control means, controls said engine in accordance with the received difference in number of engine revolutions, and when said engine control means does not receive the difference in number of engine revolutions, said engine control means controls said engine in accordance with the number of engine revolutions in the usual idling state.

3. The power supply system by use of a vehicle according to claim 1, wherein said output means are provided in a car room and out of a vehicle.

* * * * *